Figure 1:
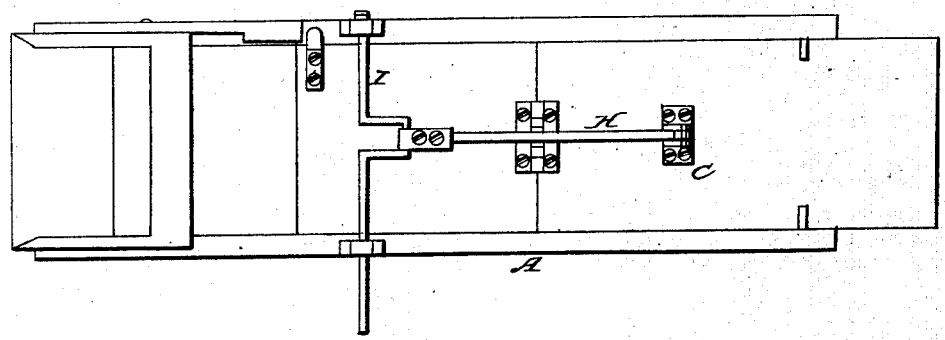
Figure 2:
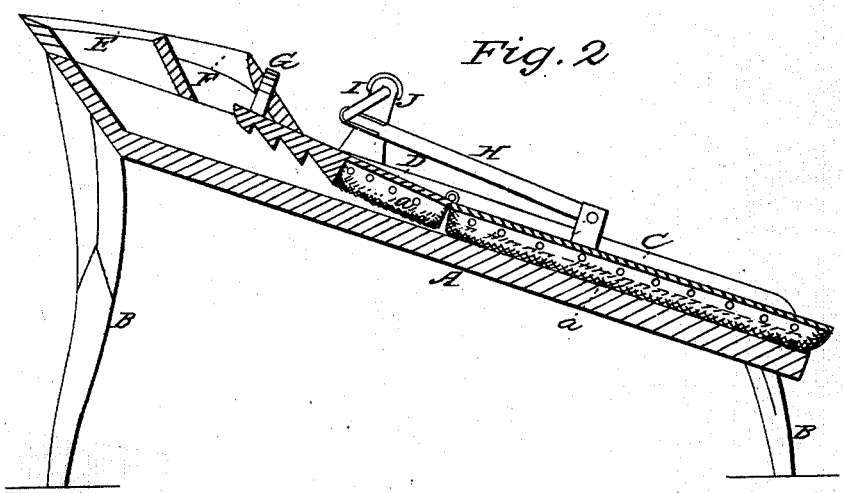

A. WELLS.
Cotton-Seed Cleaner.

No. 60,300.      Patented Dec. 4, 1866.

United States Patent Office.

IMPROVEMENT IN COTTON SEED CLEANERS.

A. WELLS, OF MORGANTOWN, WEST VIRGINIA.

Letters Patent No. 60,300, dated December 4, 1866.

SPECIFICATION.

TO ALL WHOM IT MAY CONCERN:

Be it known that I, A. WELLS, of Morgantown, in the county of Monongahala, and State of West Virginia, have invented certain new and useful improvements in Cotton Seed Cleaners; and I do hereby declare that the following is a full, clear, and exact description of the same, reference being had to the accompanying drawings, and to the letters of reference marked thereon.

In the annexed drawings, making part of this specification, A represents a trough or box, with square or flat bottom, with parallel sides, and without an end piece at its lower end. This box or trough is supported upon four legs, B B, the legs at one end being much shorter at one end than at the other, as seen, thereby giving the trough or box an inclination of nearly forty-five degrees. This trough has no cover or top, but is provided with a reciprocating slide, about one-half the length of the trough, and of its inside width, but made so that it slides easily when being operated. The slide C is provided with a hinged board, D, at its upper end. The under side of the slide (and a portion of the under side of the board D) is provided with coarse canvass or leather, or India rubber, or any suitable material, which is tacked or secured to it. Wool or cotton is stuffed between the canvass and the under side of the slide, so as to make it elastic. The upper portion of the board D is provided with several grooves or corrugations, as shown, for the purpose of drawing the seed down. G represents a small metallic bar, which is secured to the upper side of the board D, and which projects upward. This bar is curved or bent at right angles at its upper end, and when the slide C is pushed toward the upper end of the trough, this bent end of the bar passes up the inclined surface of a drop guide, F, (raising the upper end of the board D) until it arrives at a certain point on said guide, where a portion of the material of which it is made is cut away, then the bar ceases to catch upon the guide, and allows the board D to drop upon the seed which have passed under it. The guide F is pivoted or hinged to the side of the trough or seed hopper E, either. As the bar G passes back when the slide is pushed toward the lower end of the trough, it runs under the guide F, elevating it; but as soon as it has passed between the lower end of the guide, said guide drops and is again ready to receive and elevate the bar and board, thus, as the slide is given a reciprocating endwise movement, by means of the pitman H and crank-shaft I, the upper end of the board D rises and falls alternately, catching the seed which pass to it from the hopper E. The seed are rolled under the board D and slide C, as they work in the trough, and have, by this rolling movement, the fibres which surround them packed close to the seed. When the seed emerge from the machine, after having been thus rolled between two surfaces, one of which is elastic, the fibrous material surrounding them is so tightly packed to the seed that they present a smooth surface, and can be easily planted either by machine or by hand. J J are two uprights upon the trough, in which the crank-shaft I has its bearings. By soaking the seed in a little water and then rolling them in this machine, they are separated from each other, and from clumps and bunches, and rendered as easy of management as other smooth seed.

Having thus fully described my invention, what I claim as new and desire to secure by Letters Patent, is—

1. The reciprocating slide C, used in connection with the inclined trough A, substantially as and for the purpose herein specified.

2. The arrangement of the slide C and board D, as constructed on their under sides, with the bar G, guide F, and trough A, as and for the purpose herein specified.

3. Providing the under side of the slide with an elastic covering, for the purpose of rolling the seed between it and the bottom of the trough, as and for the purpose set forth.

As evidence that I claim the foregoing, I have hereunto placed my hand in the presence of two witnesses.

A. WELLS.

J. M. HARTLY,
R. T. BOREMAN.